United States Patent
Sainis et al.

(10) Patent No.: US 10,324,577 B2
(45) Date of Patent: Jun. 18, 2019

(54) WRITEABLE ELECTROPHORETIC DISPLAYS INCLUDING SENSING CIRCUITS AND STYLI CONFIGURED TO INTERACT WITH SENSING CIRCUITS

(71) Applicant: E INK CORPORATION, Billerica, MA (US)

(72) Inventors: Sunil Krishna Sainis, Melrose, MA (US); Seth J. Bishop, Framingham, MA (US); Ana L. Lattes, Newton, MA (US); Ming-Chuan Hung, Taoyuan (TW); Shi-Lin Li, Hsinchu (TW)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 15/906,323

(22) Filed: Feb. 27, 2018

(65) Prior Publication Data
US 2018/0246598 A1    Aug. 30, 2018

Related U.S. Application Data

(60) Provisional application No. 62/464,780, filed on Feb. 28, 2017.

(51) Int. Cl.
*G06F 3/044*    (2006.01)
*G02F 1/167*    (2019.01)
(Continued)

(52) U.S. Cl.
CPC .............. *G06F 3/044* (2013.01); *G02F 1/167* (2013.01); *G06F 3/03545* (2013.01);
(Continued)

(58) Field of Classification Search
CPC .. G02F 1/167; G02F 1/1676; G02F 2201/123; G06F 2203/04103;
(Continued)

(56) References Cited

U.S. PATENT DOCUMENTS 5,760,761 A    6/1998 Sheridon
5,777,782 A    7/1998 Sheridon
(Continued)

FOREIGN PATENT DOCUMENTS

| WO | 1999067678 A2 | 12/1999 |
| WO | 2000005704 A1 | 2/2000 |
| WO | 2000038000 A1 | 6/2000 |

OTHER PUBLICATIONS

Wood, D., "An Electrochromic Renaissance?" Information Display, 18(3), 24 (Mar. 2002).
(Continued)

*Primary Examiner* — Dmitriy Bolotin
(74) *Attorney, Agent, or Firm* — Brian D. Bean

(57) ABSTRACT

A writeable display medium incorporating various sensing elements into the backplane of the writeable display medium so that the sensing elements can cause the associated pixels to update immediately in contrast to state-of-the art writeable displays that rely on a feedback loop between a digitizing layer and a display driver that controls the output of a display. As a stylus is moved over the display, a signal emitted from the stylus (e.g., an electromagnetic field) will change the state of a transistor associated with a pixel, resulting in a nearly instantaneous state change in the display (i.e., white to black).

20 Claims, 7 Drawing Sheets

(51) Int. Cl.
  *G06F 3/0354* (2013.01)
  *G06F 3/041* (2006.01)
  *G06F 3/046* (2006.01)
  *G09G 3/34* (2006.01)
  *G02F 1/1676* (2019.01)

(52) U.S. Cl.
  CPC ............ *G06F 3/046* (2013.01); *G06F 3/0412* (2013.01); *G06F 3/0416* (2013.01); *G02F 1/1676* (2019.01); *G02F 2201/123* (2013.01); *G06F 2203/04103* (2013.01); *G09G 3/344* (2013.01)

(58) Field of Classification Search
  CPC .. G06F 3/03545; G06F 3/0412; G06F 3/0416; G06F 3/044; G06F 3/046; G09G 3/344
  See application file for complete search history.

(56) References Cited

U.S. PATENT DOCUMENTS

| | | |
|---|---|---|
| 5,808,783 A | 9/1998 | Crowley |
| 6,054,071 A | 4/2000 | Mikkelsen, Jr. |
| 6,055,091 A | 4/2000 | Sheridon |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson |
| 6,137,467 A | 10/2000 | Sheridon |
| 6,147,791 A | 11/2000 | Sheridon |
| 6,177,921 B1 | 1/2001 | Comiskey |
| 6,232,950 B1 | 5/2001 | Albert |
| 6,252,564 B1 | 6/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,480,182 B2 | 11/2002 | Turner |
| 6,498,114 B1 | 12/2002 | Amundson |
| 6,506,438 B2 | 1/2003 | Duthaler |
| 6,518,949 B2 | 2/2003 | Drzaic |
| 6,521,489 B2 | 2/2003 | Duthaler et al. |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,680,725 B1 | 1/2004 | Jacobson |
| 6,683,333 B2 | 1/2004 | Kazlas |
| 6,724,519 B1 | 4/2004 | Comiskey |
| 6,750,473 B2 | 6/2004 | Amundson |
| 6,816,147 B2 | 11/2004 | Albert |
| 6,819,471 B2 | 11/2004 | Amundson |
| 6,825,068 B2 | 11/2004 | Denis |
| 6,831,769 B2 | 12/2004 | Holman |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,873,452 B2 | 3/2005 | Tseng |
| 6,909,532 B2 | 6/2005 | Chung |
| 6,922,276 B2 | 7/2005 | Zhang |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen |
| 7,012,600 B2 | 3/2006 | Zehner |
| 7,012,735 B2 | 3/2006 | Honeyman |
| 7,030,412 B1 | 4/2006 | Drzaic et al. |
| 7,072,095 B2 | 7/2006 | Liang |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson |
| 7,144,942 B2 | 12/2006 | Zang |
| 7,148,128 B2 | 12/2006 | Jacobson |
| 7,167,155 B1 | 1/2007 | Albert |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,256,766 B2 | 8/2007 | Albert et al. |
| 7,259,744 B2 | 8/2007 | Arango |
| 7,280,094 B2 | 10/2007 | Albert |
| 7,301,693 B2 | 11/2007 | Chaug |
| 7,304,780 B2 | 12/2007 | Liu |
| 7,327,346 B2 | 2/2008 | Chung |
| 7,327,511 B2 | 2/2008 | Whitesides |
| 7,339,715 B2 | 3/2008 | Webber |
| 7,347,957 B2 | 3/2008 | Wu |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |
| 7,401,758 B2 | 7/2008 | Liang |
| 7,411,719 B2 | 8/2008 | Paolini, Jr. |
| 7,420,549 B2 | 9/2008 | Jacobson |
| 7,442,587 B2 | 10/2008 | Amundson et al. |
| 7,453,445 B2 | 11/2008 | Amundson |
| 7,492,497 B2 | 2/2009 | Paolini, Jr. |
| 7,535,624 B2 | 5/2009 | Amundson et al. |
| 7,551,346 B2 | 6/2009 | Fazel |
| 7,554,712 B2 | 6/2009 | Patry et al. |
| 7,560,004 B2 | 7/2009 | Pereira |
| 7,583,427 B2 | 9/2009 | Danner |
| 7,598,173 B2 | 10/2009 | Ritenour |
| 7,605,799 B2 | 10/2009 | Amundson et al. |
| 7,636,191 B2 | 12/2009 | Duthaler |
| 7,649,674 B2 | 1/2010 | Danner |
| 7,667,886 B2 | 2/2010 | Danner |
| 7,672,040 B2 | 3/2010 | Sohn |
| 7,679,814 B2 | 3/2010 | Paolini, Jr. |
| 7,688,497 B2 | 3/2010 | Danner |
| 7,715,088 B2 | 5/2010 | Liang |
| 7,733,335 B2 | 6/2010 | Zehner |
| 7,785,988 B2 | 8/2010 | Amundson |
| 7,830,592 B1 | 11/2010 | Sprague |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,880,958 B2 | 2/2011 | Zang |
| 7,893,435 B2 | 2/2011 | Kazlas et al. |
| 7,898,717 B2 | 3/2011 | Patry |
| 7,905,977 B2 | 3/2011 | Qi |
| 7,957,053 B2 | 6/2011 | Honeyman |
| 7,986,450 B2 | 7/2011 | Cao |
| 8,009,344 B2 | 8/2011 | Danner |
| 8,027,081 B2 | 9/2011 | Danner |
| 8,049,947 B2 | 11/2011 | Danner |
| 8,072,675 B2 | 12/2011 | Lin |
| 8,077,141 B2 | 12/2011 | Duthaler |
| 8,089,453 B2 | 1/2012 | Comiskey |
| 8,120,836 B2 | 2/2012 | Lin |
| 8,159,636 B2 | 4/2012 | Sun |
| 8,208,193 B2 | 6/2012 | Patry |
| 8,237,892 B1 | 8/2012 | Sprague |
| 8,238,021 B2 | 8/2012 | Sprague |
| 8,362,488 B2 | 1/2013 | Chaug |
| 8,373,211 B2 | 2/2013 | Amundson |
| 8,389,381 B2 | 3/2013 | Amundson |

(56) References Cited

U.S. PATENT DOCUMENTS

| | | | |
|---|---|---|---|
| 8,395,836 B2 | 3/2013 | Lin | |
| 8,416,174 B2 | 4/2013 | Yoshinaga et al. | |
| 8,437,069 B2 | 5/2013 | Lin | |
| 8,441,414 B2 | 5/2013 | Lin | |
| 8,456,589 B1 | 6/2013 | Sprague | |
| 8,498,042 B2 | 7/2013 | Danner | |
| 8,514,168 B2 | 8/2013 | Chung | |
| 8,547,628 B2 | 10/2013 | Wu | |
| 8,576,162 B2 | 11/2013 | Kang | |
| 8,593,438 B2 * | 11/2013 | Komatsu | G09G 3/344 345/204 |
| 8,610,988 B2 | 12/2013 | Zehner et al. | |
| 8,714,780 B2 | 5/2014 | Ho | |
| 8,728,266 B2 | 5/2014 | Danner | |
| 8,743,077 B1 | 6/2014 | Sprague | |
| 8,754,859 B2 | 6/2014 | Gates | |
| 8,797,258 B2 | 8/2014 | Sprague | |
| 8,797,633 B1 | 8/2014 | Sprague | |
| 8,797,636 B2 | 8/2014 | Yang | |
| 8,830,560 B2 | 9/2014 | Danner | |
| 8,891,155 B2 | 11/2014 | Danner | |
| 8,969,886 B2 | 3/2015 | Amundson | |
| 9,025,234 B2 | 5/2015 | Lin | |
| 9,025,238 B2 | 5/2015 | Chan | |
| 9,030,374 B2 | 5/2015 | Sprague | |
| 9,069,421 B2 | 6/2015 | Liu | |
| 9,140,952 B2 | 9/2015 | Sprague | |
| 9,147,364 B2 | 9/2015 | Wu | |
| 9,152,003 B2 | 10/2015 | Danner | |
| 9,152,004 B2 | 10/2015 | Paolini, Jr. | |
| 9,201,279 B2 | 12/2015 | Wu | |
| 9,223,164 B2 | 12/2015 | Lai | |
| 9,238,340 B2 | 1/2016 | Kayal | |
| 9,279,906 B2 | 3/2016 | Kang | |
| 9,285,648 B2 | 3/2016 | Liu | |
| 9,310,661 B2 | 4/2016 | Wu | |
| 9,419,024 B2 | 8/2016 | Amundson | |
| 9,454,057 B2 | 9/2016 | Wu | |
| 9,489,502 B2 | 11/2016 | Davis et al. | |
| 9,529,240 B2 | 12/2016 | Paolini, Jr. | |
| 9,620,066 B2 | 4/2017 | Bishop | |
| 9,671,635 B2 | 6/2017 | Paolini, Jr. | |
| 2002/0060321 A1 | 5/2002 | Kazlas | |
| 2004/0085619 A1 | 5/2004 | Wu | |
| 2004/0105036 A1 | 6/2004 | Danner et al. | |
| 2005/0122306 A1 | 6/2005 | Wilcox et al. | |
| 2005/0122563 A1 | 6/2005 | Honeyman et al. | |
| 2006/0255322 A1 | 11/2006 | Wu | |
| 2007/0052757 A1 | 3/2007 | Jacobson | |
| 2008/0238871 A1 * | 10/2008 | Tam | G02F 1/1533 345/158 |
| 2009/0009465 A1 * | 1/2009 | Choi | G06F 3/0412 345/107 |
| 2009/0122389 A1 | 5/2009 | Whitesides | |
| 2009/0237333 A1 * | 9/2009 | Saito | G09G 3/344 345/76 |
| 2009/0315044 A1 | 12/2009 | Amundson | |
| 2010/0177396 A1 | 7/2010 | Lin | |
| 2011/0134156 A1 * | 6/2011 | Yamazaki | G02F 1/167 345/690 |
| 2011/0140744 A1 | 6/2011 | Kazlas | |
| 2011/0141082 A1 * | 6/2011 | Yamazaki | G09G 3/3446 345/209 |
| 2011/0187683 A1 | 8/2011 | Wilcox | |
| 2011/0292319 A1 | 12/2011 | Cole | |
| 2012/0223929 A1 * | 9/2012 | Sato | G02F 1/167 345/211 |
| 2012/0306819 A1 | 12/2012 | Yamazaki et al. | |
| 2013/0278900 A1 | 10/2013 | Hertel et al. | |
| 2014/0078024 A1 | 3/2014 | Paolini, Jr. | |
| 2014/0139501 A1 | 5/2014 | Amundson | |
| 2014/0192000 A1 | 7/2014 | Hung | |
| 2014/0210701 A1 | 7/2014 | Wu | |
| 2014/0300837 A1 | 10/2014 | Gates | |
| 2014/0368753 A1 | 12/2014 | Cheng | |
| 2014/0376164 A1 | 12/2014 | Huang | |
| 2015/0206478 A1 * | 7/2015 | Yamazaki | G09G 3/344 345/206 |
| 2015/0226986 A1 | 8/2015 | Paolini, Jr. | |
| 2015/0227018 A1 | 8/2015 | Paolini, Jr. | |
| 2015/0261057 A1 | 9/2015 | Harris | |
| 2015/0356927 A1 | 12/2015 | Hung | |
| 2015/0378235 A1 | 12/2015 | Lin | |
| 2016/0077375 A1 | 3/2016 | Lin | |
| 2016/0103380 A1 | 4/2016 | Kayal | |
| 2016/0187759 A1 | 6/2016 | Wu | |
| 2016/0239113 A1 | 8/2016 | Bishop et al. | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, U. et al., "Nanomaterials-Based Electrochromics for Paper-Quality Displays", Adv. Mater, vol. 14, No. 11, pp. 845-848 (Jun. 2002).

Hayes, R.A. et al., "Video-Speed Electronic Paper Based on Electrowetting", Nature, vol. 425, No. 25, pp. 383-385 (Sep. 2003).

"http://www.resistorguide.com/magneto-resistor/" (Web) Sep. 21, 2016.

"https://www.hauzertechnocoating.com/en/plasma-coating/#magnetron-sputtering" (Web) Sep. 21, 2016.

Heidecker, Jason, "MRAM Technology and Status", NEPP Electronic Technology Workshop, California Institute of Technology, Jun. 11, 2012.

Ditizio, Robert et al., "Cell Shape and Patterning Considerations for Magnetic Random Access Memory (MRAM) Fabrication", Semiconductor Manufacturing Magazine, Jan. 2004.

Korean Intellectual Property Office, PCT/2018/019906, International Search Report and Written Opinion, Jun. 12, 2018.

* cited by examiner

WRITEABLE ELECTROPHORETIC DISPLAYS INCLUDING SENSING CIRCUITS AND STYLI CONFIGURED TO INTERACT WITH SENSING CIRCUITS

RELATED APPLICATIONS

This application claims priority to U.S. Provisional Application No. 62/464,780, filed Feb. 28, 2017, which is incorporated herein by reference in its entirety.

BACKGROUND OF INVENTION

This invention relates to writable electronic tablets that allow users to take notes, draw figures, and edit documents electronically. In some embodiments, the writable electronic tablets record the writings/drawings and convert them into a digital format that is easily saved, recalled, and shared. In some embodiments, the writeable electronic tablets merely provide an alternative format to take notes, draw designs, and leave messages.

A number of LCD-based tablets are commercially-available that have the ability to record a user's writing, drawing, or mark-up of documents. For example, the Microsoft SURFACE® Pro 4 (Microsoft Corporation, Redmond, Wash.) comes with a stylus (SURFACE PEN®) that allows a user to take notes, draw, and mark-up documents that are viewed on the LCD touch screen. The position of the stylus is tracked by broadcasting a signal from the stylus tip to the capacitive touch screen of the tablet, whereby a proximity-sensing algorithm is used to determine the location of the stylus. Other LCD-based tablets, such as the Sony VAIO LX900 (Sony Corporation, Tokyo, Japan) use the digitizing technology of Wacom (Wacom Co. Ltd., Kazo, Japan) whereby the stylus tip (including an inductive loop) is located by an energized digitizing layer located behind the LCD display. The digitizing layer typically comprises a grid of overlapping electrodes adjacent a magnetic film. The stylus head in the Wacom system includes an inductive coil, and the motion of the coil during writing can be translated into a position with respect to the grid defined by the electrodes in the digitizing layer.

A common complaint from users is that these LCD-based tablets do not provide a "paper-like" experience. First, because the LCD is power-hungry, the screen will often go dark when the tablet is not in active use. This means that a user has to "wake up" the device to start writing, and sometimes has to reawaken the device during a writing session because the device went "to sleep" while the user was listening to a speaker, or otherwise engaged in a different task. Secondly, the pen strokes do not feel or look like writing on paper because the texture, depth, and latency of the writing device is perceptibly different that using a pen on real paper. Often when writing on an LCD display with a stylus, a user has the sense that he/she is dragging a plastic stick across a plate of glass. Furthermore, when using these types of electronic tablets, the writing has a "depth" into the viewing surface that is disorienting. The written words are not at the top surface interacting with the stylus, but rather disconnected from the stylus tip.

Alternate electronic writing devices have been constructed using light-reflective media, such as electrophoretic ink (E Ink Corporation, Billerica, Mass.). See, for example, the DPTS1™ from Sony (Sony Corporation, Tokyo, Japan). Electrophoretic ink solves many of the "sleeping" problem of LCD-based writing systems because the devices are always "on". They consume far less power during the writing process so they don't need to go to sleep except when prompted by the user, and even after they are asleep they continue to display the writing. Additionally, because the electrophoretic ink is very close to the surface of the device, the pen response looks more like writing. The devices are also sunlight-readable, which makes it possible to use the device outdoors or in other bright-light environments. Some commercially-available electrophoretic ink devices, such as the ReMARKABLE™ tablet (REMARKABLE A.S., Oslo, Norway), also include high-friction surface materials that create a "feel" that is far more paper-like. While such friction materials can be included on LCD displays, the materials can interfere with the image quality of the LCD because the friction materials scatter the light emitted from the display.

Regardless of the format (LCD or electrophoretic ink), users of electronic (tablet) display writing systems typically experience distracting latency between stylus movement and image updates when writing. This latency is caused by the time that is required to sense the position of the stylus and update the image driver so that the movement of the stylus is accurately portrayed as writing/drawing on the screen. The latency is the additive delay of a series of steps such as sensing the position of the stylus, sending the position information to the display driver, processing the display change, and refreshing the display. In many cases, the position information is additionally saved to memory to allow the user to later recall the notes, and this saving step may add an additional small delay. In LCD-based systems, the latency is typically on the order of 60 ms. Many users find the latency to be distracting, and in some cases, the latency limits the speed that a user can take notes, draw, etc.

In addition to the sensing and saving the position information, there may be additional lag time associated with refreshing the image to show the writing. For example, electrophoretic ink systems often have latencies of at least 100 ms because of the additional time (20-40 ms) that it takes to drive the electrophoretic particles between image states after the update is sent to the pixels. In addition, the latency may vary depending upon what portion of the display is being updated. That is, the latency is different across the display surface because the display driver updates the scan lines in an orderly fashion. For example, the latency may be more noticeable when writing in the lower right-hand corner of a tablet versus the upper left-hand corner.

To counter the latency, some manufacturers use predictive algorithms to reduce the number of updates needed to capture the writing. These predictive algorithms may, for example, process the previous letters that were written and predict the next letters. The algorithms may also employ a rolling average to anticipate straight lines or use smoothing to account for fluctuations in stylus sensing. Nonetheless, such algorithms can result in unintended strokes being generated which can be just as distracting to a user as waiting for updates.

SUMMARY OF INVENTION

The invention addresses several shortcomings of the prior art by providing a writeable display medium that is paper-like and allows nearly instantaneous text updates as the stylus is moved across the surface of the display. In one aspect, the writeable display medium includes a light-transmissive front electrode, an array of pixel electrodes, an electrophoretic medium comprising charged particles that move in the presence of an electric field sandwiched between the light-transmissive front electrode and the array of pixel electrodes, first and second set of transistors, and a digitizing layer configured to locate a touch on the writeable display medium. The first set of transistors each have a drain, source, and gate, wherein the source is coupled to a data driver, the gate is coupled to a scan driver, and the drain is coupled to one of the pixel electrodes. The second set of transistors each have a drain, source, and gate, wherein the source is coupled to a write voltage source, the gate is coupled to a sensing circuit, and the drain is coupled to one of the pixel electrodes. The invention allows the display state to be quickly altered with a stylus configured to actuate the sensing circuit. For example, the sensing circuit can include a magnetoresistor and the stylus can include a magnet. Alternatively, the sensing circuit can include a photoresistor and the stylus can include a light source. In embodiments using photoresistors, the writeable display medium may also include an optical filter. The stylus may be capable of independently interacting with the digitizing layer, or it the stylus may have additional circuitry to interact with the digitizing layer.

Often the writeable display medium will include a power source operatively coupled to the data driver, scan driver, and write voltage source. The writeable display medium may also be coupled to memory that can be used to receive position information from the digitizing layer and to send the position information to the display driver. The writeable display medium is useable with digitizing layers, generally, so digitizing layers using either electromagnetic or capacitive sensing can be used with the invention. The position information recorded by the digitizer can be written to memory whereby the position information can be the basis for a global update of the written image and also be sent (via electronic format) to a file or another device, such as a phone, digital whiteboard, computer, secondary display, etc.

In another aspect, the writeable display medium includes a light-transmissive front electrode, an array of pixel electrodes, an electrophoretic medium comprising charged particles that move in the presence of an electric field sandwiched between the light-transmissive front electrode and the array of pixel electrodes, a plurality of transistors, a plurality of rectifier circuits, a plurality of inductive coils, and a digitizing layer configured to locate a touch on the writeable display medium. Each transistor has a drain, source, and gate, wherein the source is coupled to a data driver, the gate is coupled to a scan driver, and the drain is coupled to one of the pixel electrodes. Each rectifier circuit is operatively coupled to a pixel electrode, and each rectifier circuit is associated with an inductive coil. The invention allows the display state to be quickly altered with a stylus configured to induce a current in an inductive coil. The rectifier circuit will often include a full bridge diode, which will facilitate charging the pixel electrode with alternating currents created in the inductive coil. In some embodiments, the stylus will include an electromagnet.

In another aspect, the writeable display medium includes a light-transmissive front electrode, an array of pixel electrodes, an electrophoretic medium comprising charged particles that move in the presence of an electric field sandwiched between the light-transmissive front electrode and the array of pixel electrodes, a plurality of transistors, a plurality of Hall-Effect switches operatively coupled between a write voltage source and one of the pixel electrodes, and a digitizing layer configured to locate a touch on the writeable display medium. Each transistor has a drain, source, and gate, wherein the source is coupled to a data driver, the gate is coupled to a scan driver, and the drain is coupled to one of the pixel electrodes. The invention allows the display state to be quickly altered with a stylus configured to switch the Hall-Effect switch, which will facilitate charging the pixel electrode from the write voltage source. In some embodiments, the stylus will include an electromagnet.

In another aspect, the writeable display medium includes a light-transmissive front electrode, an array of pixel electrodes, an electrophoretic medium comprising charged particles that move in the presence of an electric field sandwiched between the light-transmissive front electrode and the array of pixel electrodes, a first set of transistors, and a second set of transistors. For the first set of transistors, each transistor has a drain, source, and gate, wherein the source is coupled to a global reset voltage source, the gate is coupled to a global reset gate voltage source, and the drain is coupled to one of the pixel electrodes. For the second set of transistors, each transistor has a drain, source, and gate, wherein the source is coupled to a write voltage source, the gate is coupled to a sensing circuit, and the drain is coupled to one of the pixel electrodes. In this aspect the writeable display does not include a digitizing layer. The invention allows the display state to be quickly altered with a stylus configured to actuate the sensing circuit. For example, the sensing circuit can include a magnetoresistor and the stylus can include a magnet. Alternatively, the sensing circuit can include a photoresistor and the stylus includes a light source. In embodiments using photoresistors, the writeable display medium may also include an optical filter. Such a writeable display is inexpensive to fabricate, and useful for general notetaking, sketching, and relaying messages.

The invention additionally includes writeable systems including one of the above-described writeable display media and a stylus that is configured to switch the state of the electrophoretic display by, e.g., interacting with the sensing circuit, inductive coil, or the Hall-Effect switch. The stylus may include a magnet, for example, an electromagnet or a rare earth magnet. In some embodiments, the stylus might include a light source such as a diode laser or a light emitting diode (LED). In embodiments where the writeable display medium includes a digitizing layer, the system may be configured to record the position of the stylus (i.e., pen stroke) and display the pen stroke on the electrophoretic display after clearing the display. The resulting writeable system thus provides immediate feedback resembling writing, while recording the pen strokes electronically.

DETAILED DESCRIPTION

Figure 1:
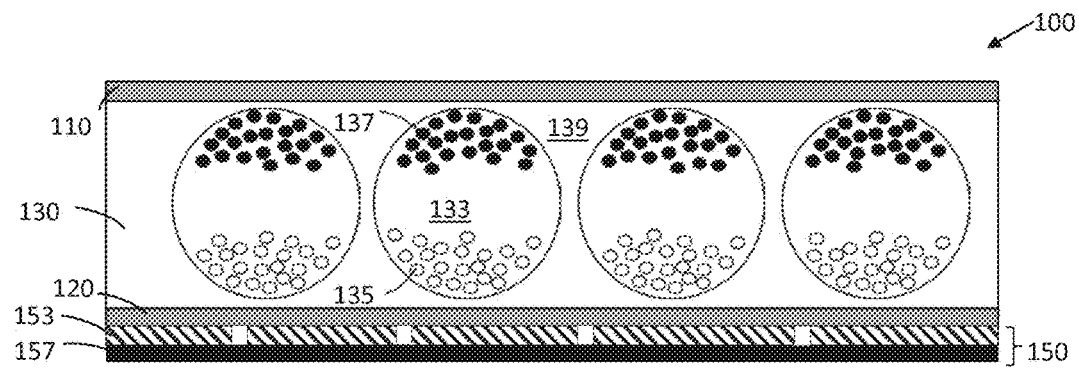
FIG. 1 is a general depiction of an electrophoretic medium, suitable for use in the invention.

As indicated above, the present invention provides a writeable display medium with faster image updates. The invention is made possible by incorporating various sensing elements into the backplane of the writeable display medium so that the sensing elements can cause the associated pixels to update immediately in contrast to state-of-the art writeable displays that rely on a feedback loop between a digitizing layer and a display driver that controls the output of a display. As a stylus is moved over the display, a signal emitted from the stylus (e.g., an electromagnetic field) will change the state of a transistor associated with a pixel, resulting in a nearly instantaneous state change in the display (i.e., white to black). Accordingly, writeable display media of the invention will not suffer from the writing latency that is experienced with most writeable tablet systems. In some embodiments the writeable display medium additionally includes a digitizing layer, that at the same time the stylus is causing a change in the display state, a separate electromagnetic (or capacitive) digitizing system is recording the position of the stylus so that the writing can be recorded electronically and transformed into an electronic image file. In other embodiments, the writeable display medium will not include a digitizing layer.

The invention is intended to be used with electrophoretic media of the type developed by E Ink Corporation (Billerica, Mass.) and described in the patents and patent publications listed below. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include: (a) Electrophoretic particles, fluids and fluid additives; see for example U.S. Pat. Nos. 7,002,728 and 7,679,814; (b)

Capsules, binders and encapsulation processes; see for example U.S. Pat. Nos. 6,922,276 and 7,411,719; (c) Microcell structures, wall materials, and methods of forming microcells; see for example U.S. Pat. Nos. 7,072,095 and 9,279,906; (d)

Methods for filling and sealing microcells; see for example U.S. Pat. Nos. 7,144,942 and 7,715,088; (e) Films and sub-assemblies containing electro-optic materials; see for example U.S. Pat. Nos. 6,982,178 and 7,839,564; (f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1; (g) Color formation and color adjustment; see for example U.S. Pat. Nos. 7,075, 502 and 7,839,564; and (h) Methods for driving displays; see for example U.S. Pat. Nos. 7,012,600 and 7,453,445. All of the patents and patent applications listed herein are incorporated by reference in their entirety.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating, roll coating such as knife over roll coating, forward and reverse roll coating; gravure coating; dip coating; spray coating, meniscus coating; spin coating, brush coating; air knife coating, silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

While the invention is primarily directed to electrophoretic media of the type described above and in the listed patents and patent applications, other types of electro-optic materials may also be used in the present invention. The alternative electro-optic media are typically reflective in nature, that is, they rely on ambient lighting for illumination instead of a backlight source, as found in an emissive LCD display. Alternative electro-optic media include rotating bichromal member type media as described, for example, in U.S. Pat. Nos. 5,808,783; 5,777,782; 5,760,761; 6,054,071 6,055,091; 6,097,531; 6,128,124; 6,137,467; and 6,147,791. Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another alternative electro-optic display medium is electrochromic, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

An exemplary electrophoretic display (EPID) is show in FIG. 1. Display 100 normally comprises a layer of electrophoretic material 130 and at least two other layers 110 and 120 disposed on opposed sides of the electrophoretic material 130, at least one of these two layers being an electrode layer, e.g., as depicted by layer 110 in FIG. 1. The front electrode 110 may represent the viewing side of the display 100, in which case the front electrode 110 may be a transparent conductor, such as Indium Tin Oxide (ITO) (which in some cases may be deposited onto a transparent substrate, such as polyethylene terephthalate (PET)). Such EPIDs also include, as illustrated in FIG. 1, a backplane 150, comprising a plurality of driving electrodes 153 and a substrate layer 157. The layer of electrophoretic material 130 may include microcapsules 133, holding electrophoretic pigment particles 135 and 137 and a solvent, with the microcapsules 133 dispersed in a polymeric binder 139. Nonetheless, it is understood that the electrophoretic medium (particles 135 and 137 and solvent) may be enclosed in microcells (microcups) or distributed in a polymer without a surrounding microcapsule (e.g., PDEPID design described above). Typically, the pigment particles 137 and 135 are controlled (displaced) with an electric field produced between the front electrode 110 and the pixel electrodes 153. In many conventional EPIDs the electrical driving waveforms are transmitted to the pixel electrodes 153 via conductive traces (not shown) that are coupled to thin-film transistors (TFTs) that allow the pixel electrodes to be addressed in a row-column addressing scheme. In some embodiments, the front electrode 110 is merely grounded and the image driven by providing positive and negative potentials to the pixel electrodes 153, which are individually addressable. In other embodiments, a potential may also be applied to the front electrode 110 to provide a greater variation in the fields that can be provided between the front electrode and the pixel electrodes 153.

Figure 2:
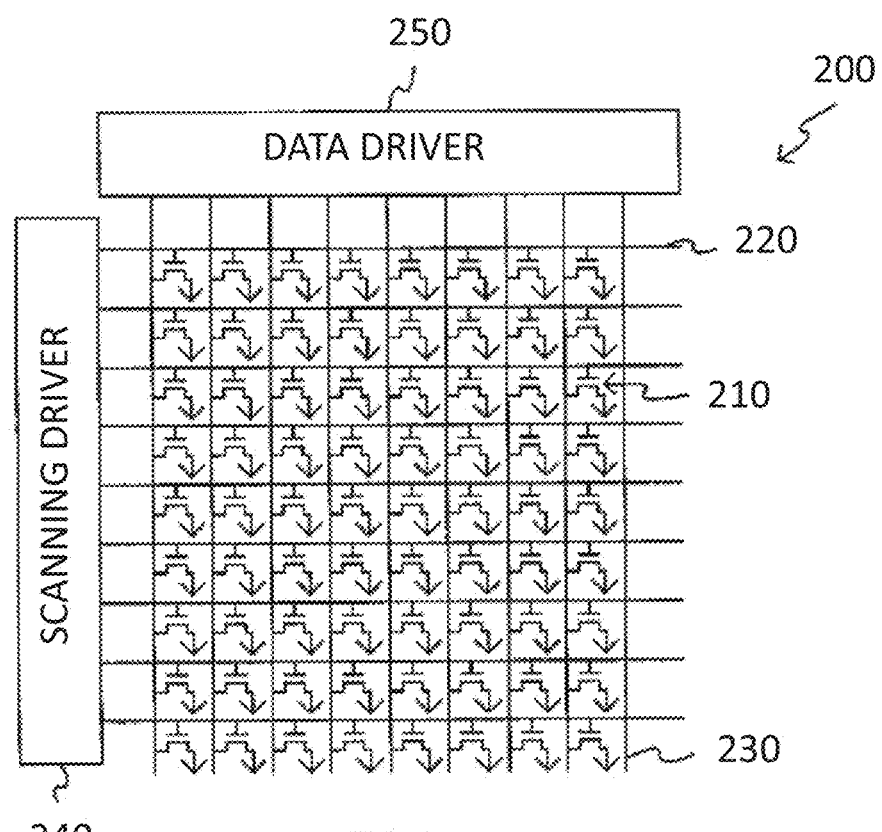
FIG. 2 is a general depiction of a thin film transistor (TFT) array, suitable for use in the invention.

In many embodiments, the TFT array forms an active matrix for image driving, as shown in FIG. 2. For example, each pixel electrode (153 in FIG. 1) is coupled to a thin-film transistor 210 patterned into an array, and connected to elongate row electrodes 220 and elongate column electrodes 230, running at right angles to the row electrodes 220. In some embodiments, one electrode layer has the form of a single continuous electrode and the other electrode layer is patterned into a matrix of pixel electrodes, each of which defines one pixel of the display. As shown in FIG. 2, the data driver 250 is connected to the column electrodes 230 and provides source voltage to all TFTs in a column that are to be addressed. The scanning driver 240 is connected to the row electrodes 220 to provide a bias voltage that will open (or close) the gates of each TFT along the row. The gate scanning rate is typically ~60-100 Hz. Taking the gate-source voltage positive allows the source voltage to be shorted to the drain. Taking the gate negative with respect to the source causes the drain source currents to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged.

While EPID media are described as "black/white," they are typically driven to a plurality of different states between black and white to achieve various tones or "greyscale." Additionally, a given pixel may be driven between first and second grayscale states (which include the endpoints of white and black) by driving the pixel through a transition from an initial gray level to a final gray level (which may or may not be different from the initial gray level). The term "waveform" will be used to denote the entire voltage against time curve used to effect the transition from one specific initial gray level to a specific final gray level. Typically, such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible to use more than one drive scheme simultaneously in different areas of the same display, and a set of drive schemes used in this manner may be referred to as "a set of simultaneous drive schemes."

The manufacture of a three-layer electrophoretic display normally involves at least one lamination operation. For example, in several of the aforementioned patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane (see FIG. 1), containing an array of pixel electrodes and an appropriate arrangement of conductors to connect the pixel electrodes to drive circuitry (see FIG. 2), is prepared. To form the final display, the substrate having the capsule/binder layer thereon is laminated to the backplane using a lamination adhesive. In embodiments where it is desired to have additional layers, such as a digitizing sensor layer (Wacom Technologies, Portland, Oreg.), those layers may be inserted between the electrode layer and the substrate, or an additional substrate may be added between the electrode layer and the additional layer. In one preferred embodiment, the backplane is itself flexible and is prepared by printing the pixel electrodes and conductors on a plastic film or other flexible substrate. The lamination technique for mass production of displays by this process is roll lamination using a lamination adhesive.

During the lamination process, one or more lamination adhesives are used to provide mechanical continuity to the stack of components and also to assure that the layers are relatively planar with respect to each other. In some instances commercial lamination adhesives (lamad) can be used, however, manufacturers of lamination adhesives (naturally) devote considerable effort to ensuring that properties, such as strength of adhesion and lamination temperatures, while ignoring the electrical properties of the lamination adhesive. Accordingly, manufactures of electrophoretic displays typically modify commercial adhesives to achieve the needed volume resistivity. Methods for modifying the electrical properties of commercial adhesives are described in several of the before-mentioned patents. The methods typically involve adding charged copolymers, charged moieties, or conductive particles. Because electrophoretic manufacturers are experienced in doping lamination adhesive layers, it is expected that adding additional components to tune the optical characteristics, e.g., to make a long pass filtering lamination adhesive layer to block certain wavelengths of light, will be straightforward. For example, to reduce transmission of wavelengths shorter than 550 nm, a lamination adhesive can be doped with anthraquinone compounds, such as 1-methylamino anthraquinone. It is also possible to incorporate a mixture of additives to tune the low pass filter such that the combination of the absorption spectrum of the TFT materials and the absorption spectrum of the additives result in a narrow window of optical wavelengths, substantially overlapping with the output of the light emitting elements incorporated into the stylus. The efficacy of a filter is often measured in terms of optical density (O.D.) where optical density is defined as the base-ten logarithm of the ratio of the radiation that falls on a material over the radiation that is transmitted through the material. The low pass filters of the invention typically have an optical density of 0.4 or greater from 400 to 550 nm, for example and O.D. of 1 or greater from 400 to 550 nm, for example an O.D. of 2 or greater from 400 to 550 nm.

Figure 3:
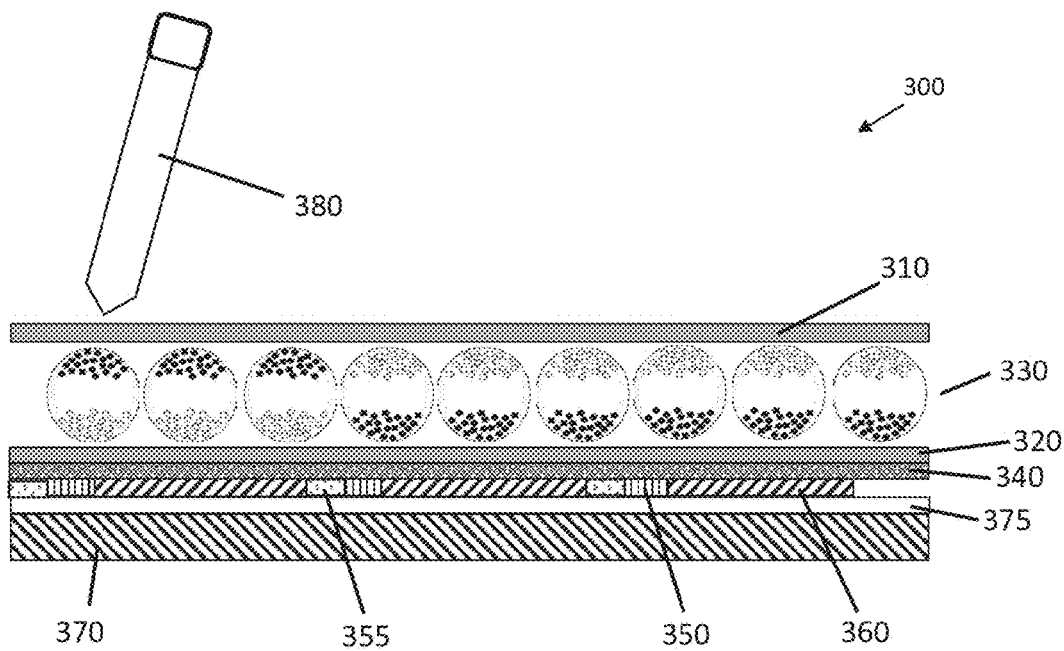
FIG. 3 depicts a writeable display medium of the invention.

The generalized working of a writeable display medium 300 is shown in FIG. 3. Like FIG. 1, writeable display medium 300 includes an electrophoretic material 330 and at least two other layers 310 and 320 disposed on opposed sides of the electrophoretic material 330, at least one of these two layers being an electrode layer, e.g., as depicted by layer 310. The front electrode 310 may be a transparent conductor, such as Indium Tin Oxide (ITO). The writeable display 300 also includes, a backplane, comprising a plurality of pixel electrodes 360 that are controlled by a plurality of transistors 350, which are often thin film transistors (TFTs). In the writeable display media of the invention, a sensor 355 is included, which may be an inductive coil, a magnetoresistor, a photosensor (photoresistor, photodiode, etc.), or a Hall-Effect switch, among other sensors, as described below. In some embodiments, especially those employing a photosensor, the writeable display medium 300 includes a long-pass optical filter 340. In alternative embodiments, the absorptive or reflective materials providing the wavelength selection for the long pass optical filter may be added directly to the lamination adhesive (part of 320) to create a long pass lamination adhesive. In embodiments that do not use light sensing a long-pass optical filter 340 is not included in the writeable display medium 300.

In some embodiments a digitizing layer 375 can be added to the assembly to track the position of the stylus 380. In an embodiment, the stylus 380 includes an inductive coil and the motion of the stylus interacts with the electromagnetic fields produced by the digitizing layer 375, allowing the digitizing layer to determine a position in the X-Y plane defined by the digitizing layer. The digitizing layer 375 is typically coupled to memory so that the movement of the stylus 380 can be recorded in an electronic file, whereby the electronic file may be printed, converted into a .pdf document, e-mailed, etc. Furthermore, the electronic file may be the basis for a global update to the image, e.g., via the display driver, after some amount of writing has been completed.

Figure 4:
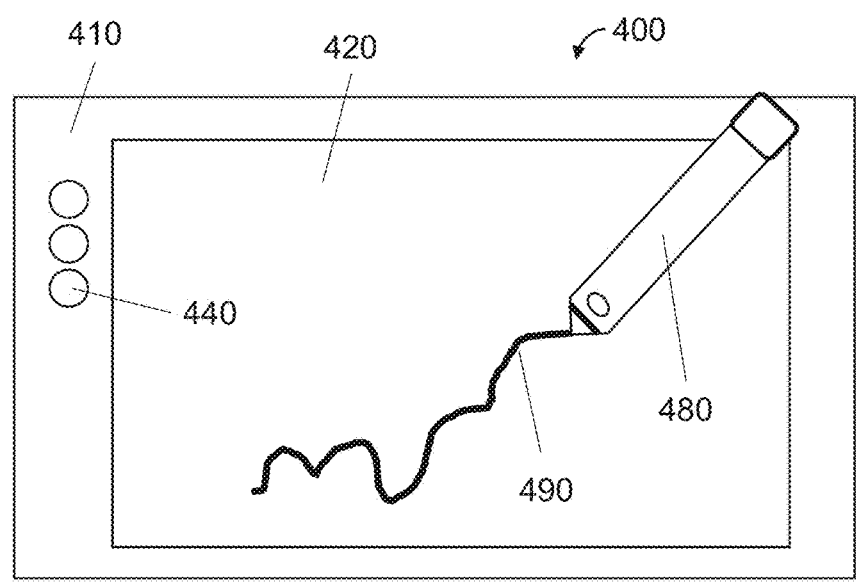
FIG. 4 illustrates writing to a writeable display medium of the invention with a stylus.

Writeable display media of the invention may be incorporated into a writeable system 400, such as shown in FIG. 4. The writeable system includes a writeable display medium 420 (discussed above with respect to FIG. 3), and a stylus 480 that emits an electromagnetic signal (magnetic field, electric field, or light) and that is configured to interact with the sensors that actuate the pixel electrodes. As shown in FIG. 4, the writeable system 400 resembles a conventional electronic writeable tablet, including a housing 410 and interfacial controls 440 which can be real or virtual. That is, the interfacial controls 440 can be separate buttons, dials, etc., or the interfacial controls 440 can be generated by the operating software and displayed/interfaced through the display.

As a user "writes" with the stylus 480 on the writeable medium 420, the electromagnetic signal emitted from the tip of the stylus 480 will pass through the light-transmissive front electrode 310 and the electrophoretic medium 330 and interact with the sensing circuit 355, which results in an increase (or decrease depending upon need) of the electrical potential on the pixel electrode 360, whereupon the electrophoretic medium 330 will begin to switch (e.g., from white to black), thereby creating a graphic 490 on the display where the stylus 480 has been. In embodiments having a separate writing voltage supply (described below), the resultant graphic 490 will appear on the writeable medium 420 in about 20 ms because, unlike prior art tablets, there is no signal processing required to create a graphic representing the movement of the stylus 480. In other words, the stylus is directly causing the pixel electrodes 360 to go to a high or low state, thus the "latency" is merely the time that it takes for the electrophoretic particles to respond to the new electrical potential of the pixel electrodes 360. In other embodiments, the sensor will begin the process of charging the pixel electrode, however the "final" electrical potential will be delivered via a TFT at the control of the scanning and data drivers, based upon the sensed position of the stylus (e.g., via the digitizing layer). This configuration provides some amount of instant feedback to the user, however does not require a separate voltage driver (different from the data driver) to push (pull) the pixel electrode to the new state.

Figure 5:
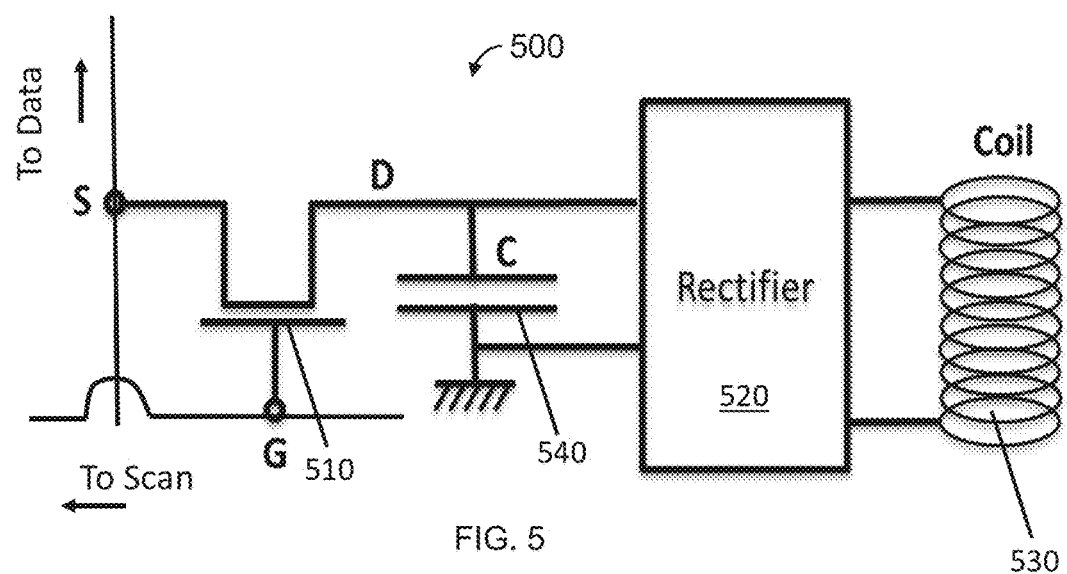
FIG. 5 illustrates an embodiment of an inductive coil and rectifier circuit for use with a writeable display medium.

An embodiment of a sensing circuit 500 for use in a writeable display medium is illustrated in FIG. 5. The sensing circuit 500 includes an inductive coil 530 that is coupled to a rectifier 520 that feeds to a pixel electrode. (The pixel electrode, the front plane electrode, and the electrophoretic medium are treated generally as a capacitor 540.) As a stylus emitting an electromagnetic signal is moved in the vicinity of the coil 530, a voltage is produced that will charge the capacitor 540 resulting in a state change of the electrophoretic display (e.g., from white to black). In addition to be actuated by the stylus, the capacitor 540 can also be addressed by the thin film transistor (TFT) 510 that is associated with each pixel electrode. This allows the pixel electrode to be addressed by the stylus or the display driver via the scanning and data drivers. Accordingly, the pixels can be written with a stylus, cleared, and then rewritten via the display driver as discussed below. The TFT 510 also allows voltage from the capacitor 540 that is produced via interaction between the stylus and the coil 530 to be drained from the capacitor so that the state can be cleared (e.g., a global update). A variety of rectifier components are suitable for use with the sensing circuit 500 of FIG. 5, such as full bridge rectifiers, which are available from Digi-Key (Thief River Falls, Minn.). In some embodiments, the diode components for the rectifier can be fabricated directly on the TFT backplane during fabrication of the TFTs.

Figure 6:
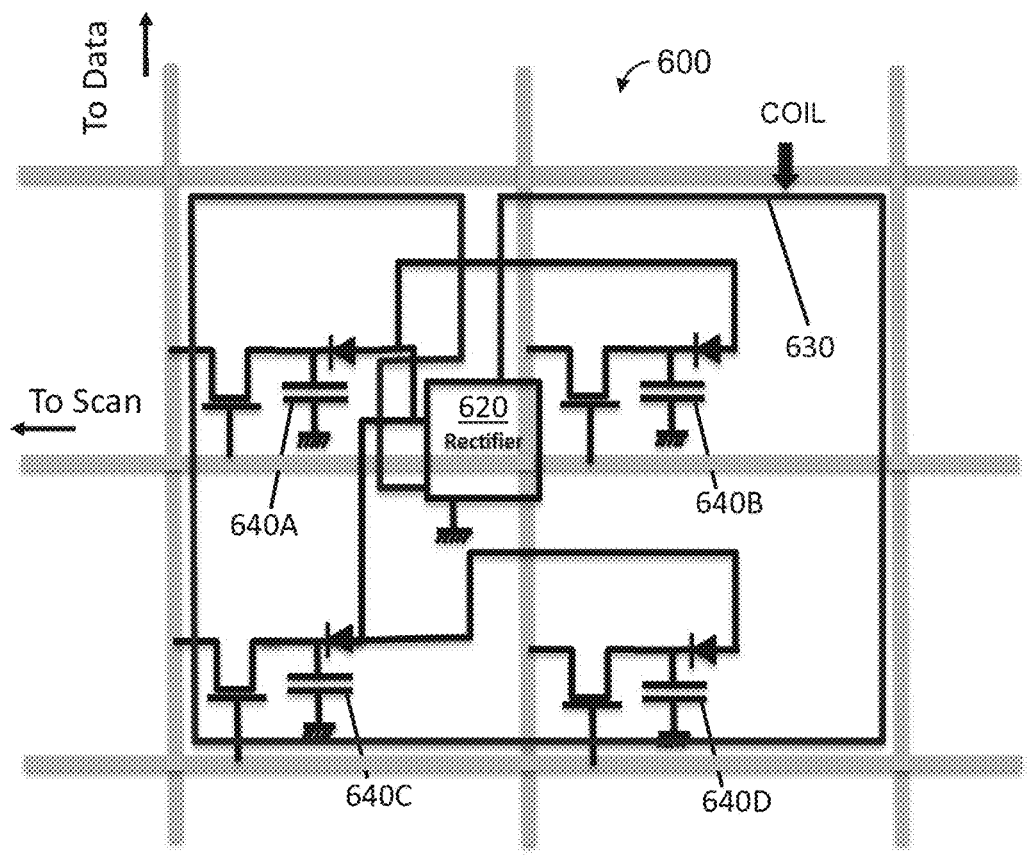
FIG. 6 illustrates an embodiment of an inductive coil and rectifier circuit for use with a writeable display medium.

The principles of the sensing circuit 500 of FIG. 5 can be expanded to cause multiple pixel electrodes to switch or pre-charge at the same time. As shown in FIG. 6, a single rectifier 620 can be coupled to a single coil 630 to pre-charge or actuate a plurality of pixel electrodes (shown as 640A-D). The coil 630 may be looped or undulating depending upon the application. When a stylus emitting an electromagnetic field is moved near the coil 630, a direct current will be produced through the rectifiers 620, thereby charging the pixel electrodes 640A-D. Sensing circuit 600 has the advantage of requiring fewer rectifiers while allowing a larger loop of coil than the sensing circuit 500 of FIG. 5. In most applications, graphics created with a stylus will be more than one pixel-width wide, so the difference in response between FIG. 5 and FIG. 6 will be negligible. It is to be understood that the number of pixel electrodes receiving charge from rectifier in FIG. 6 is somewhat arbitrary because two or more pixel electrodes 640 can be coupled to the rectifier 620. That is, in some embodiments, the rectifier 620 will be coupled to three or more pixel electrodes, e.g., four pixel electrodes, e.g., five pixel electrodes, e.g., six pixel electrodes, e.g., seven pixel electrodes, e.g., eight pixel electrodes, e.g., nine pixel electrodes.

Figure 7:
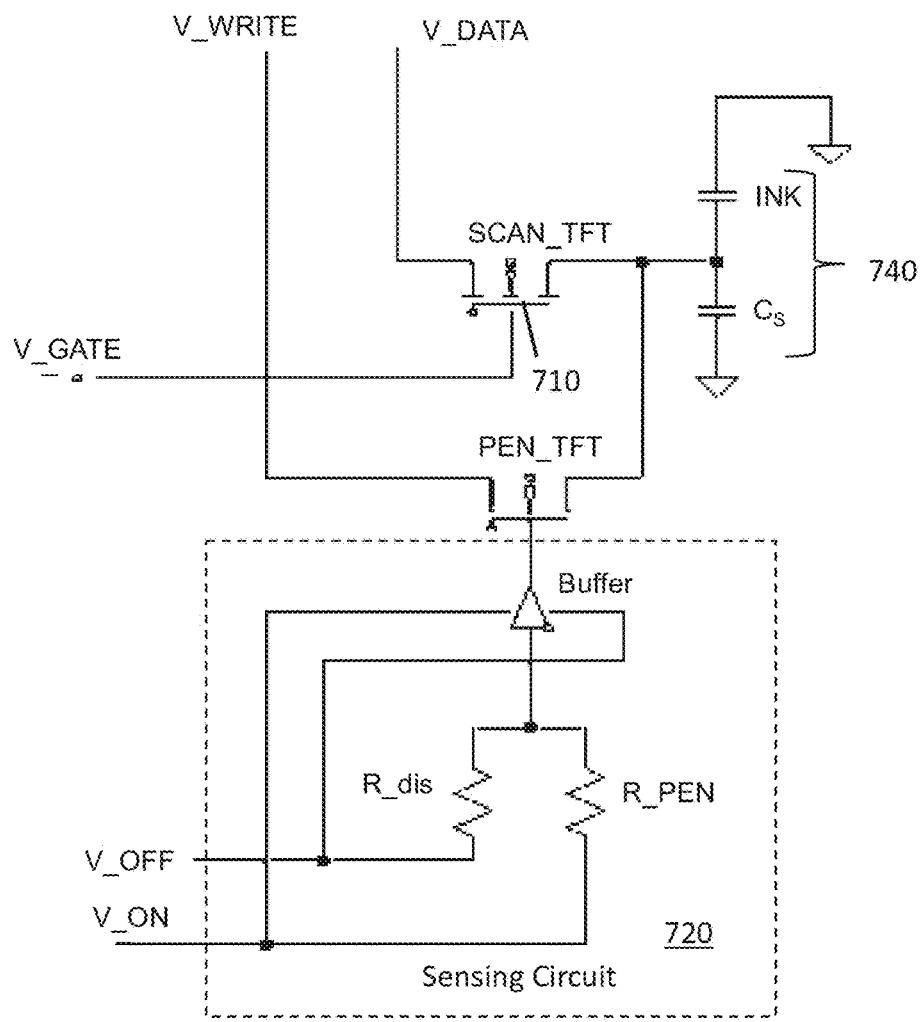
FIG. 7 illustrates an embodiment of a sensing circuit for use with a writeable display medium.
Figure 8:
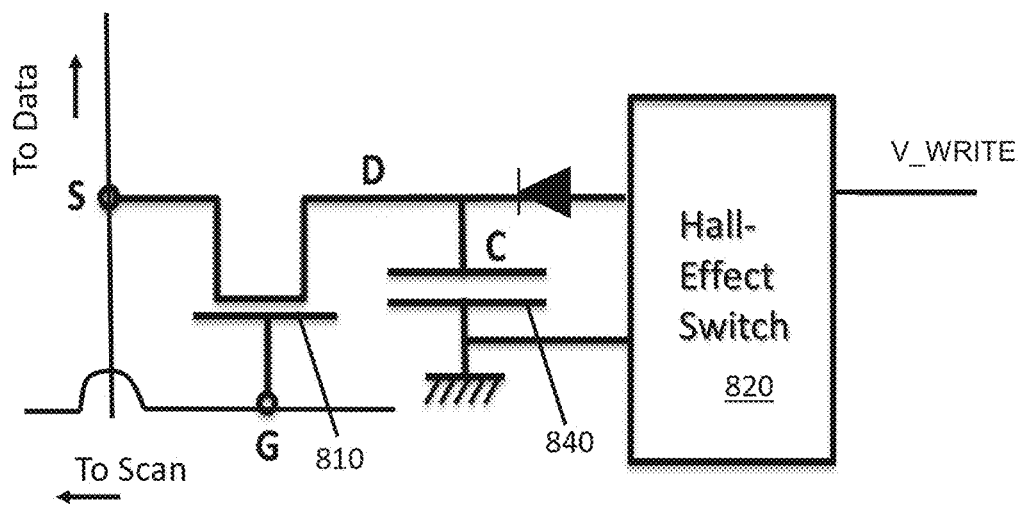
FIG. 8 illustrates an embodiment of a Hall-Effect switch circuit for use with a writeable display medium.

In contrast to FIGS. 5 and 6, which use passive charging elements for writeable display media, FIGS. 7 and 8 use active switching components, such as transistors and Hall-Effect switches. FIG. 7 illustrates an embodiment of a sensing circuit coupled to a pixel electrode for use in a writeable display medium. By using a second TFT ("PEN_TFT") it is possible to actively switch a pixel electrode as soon as a stylus is sensed in order to provide instant visual feedback to a user. As shown in FIG. 7, the PEN_TFT regulates a write voltage that is coupled to the source input of the PEN_TFT. A Buffer is connected to V_ON via a sense resistor R_PEN and to V_OFF via a second sense resistor R_dis. The sense resistors may be magnetoresistors or photoresistors, which drastically decrease (or increase) resistance in the presence of the appropriate electromagnetic signal. The Buffer is powered from the V_ON and V_OFF lines, and reduces the noise that may result from, e.g., spurious magnetic fields.

A stylus emitting an electromagnetic signal causes the resistance in R_PEN to drop while R_dis achieves greater resistance, thus pulling the gate of PEN_TFT open with V_ON and allowing the V_WRITE voltage to charge the pixel electrode, thereby switching the state of the electrophoretic medium ("INK" in FIG. 7). After the stylus is removed from proximity to the sensing circuit, the resistance in R_PEN returns, while the resistance of R_dis drops, and the gate of PEN_TFT is returned to its closed state. This will ensure that SCAN_TFT will be able to dominate the addressing of the device when the stylus is away from the pixel. Because the stylus position is recorded via the underlying sensor layer, any subsequent scan will update the display to reflect the new position of the stylus.

The invention is not limited to thin film transistors (TFTs) however, as other switching transistors or sensing switches can be used, for example, a Hall-Effect switch of FIG. 8. Nonetheless, it may be more cost effective to fabricate a second set of TFTs using the same lithographic processes and at the same time that a first set of TFTs (for controlling the pixel electrodes via data and scan lines) are fabricated. The magnetoresistors or photoresistors may also be fabricated directly into the backplane during production, for example, using magnetron sputter deposition, or they may be discrete elements such as are available commercially from suppliers. For example, a variety of magnetoresistors are available from Digi-Key, while a variety of photoresistors are available from Token Electronics (Taipei, Taiwan).

The sensing circuit shown in FIG. 7 allows a global erase either through the SCAN_TFT or by reversing the sign of the V_WRITE with additional components not shown in FIG. 7. It is also possible to enable the stylus to erase (e.g., remove black pixels) by reversing the sign of V_WRITE and using the stylus to activate PEN_TFT, as descried above. Additionally, using the circuit of FIG. 7 it is possible to write the reverse colors (e.g., white on black) by flipping the polarity of V_WRITE and using the technique described above after the pixels have been set to the dark state via the data and scan drivers.

As an alternative to sensing resistors and TFTs, similar functionality can be achieved with the circuit shown in FIG. 8, wherein a Hall-Effect Switch 820 is used to open and close V_write to allow the pixel electrode 840 to be charged, thereby causing the electrophoretic medium to switch states. The overall functioning of the Hall-Effect Switch 820 is similar to the sensing circuit 720 of FIG. 7 because the Hall-Effect Switch includes a transistor whose gate is used to control the voltage on the drain. Suitable Hall-Effect Switches can be obtained from Honeywell Sensing and Productivity Solutions, e.g., via Digi-Key. In some applications it may be advantageous to integrate the Hall-Effect switch into the backplane during fabrication.

Figure 9:
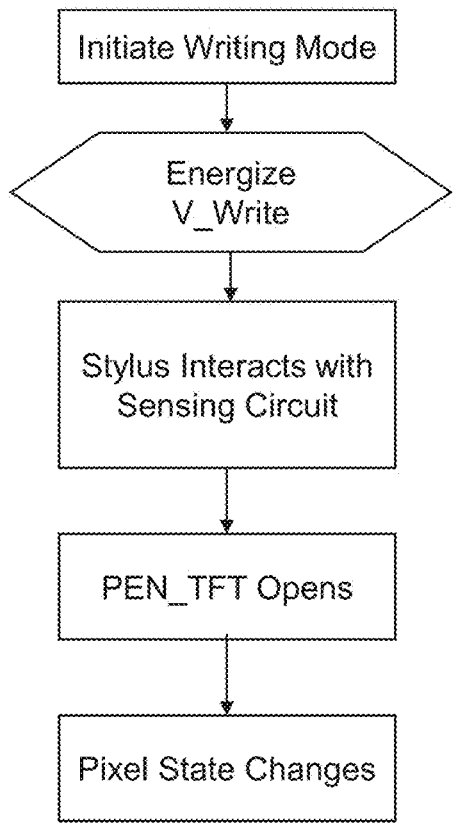
FIG. 9 illustrates an embodiment of a method for writing to writeable display medium including a sensing circuit.

A method of writing to a device including a writeable display medium having a sensing circuit of FIG. 7 is shown in FIG. 9. A user begins by initiating the writing mode, which may be done with a physical switch or by touching an icon on the screen. Once in writing mode, the source of V_Write is energized or otherwise made available to the secondary TFT, so that a pixel electrode can be energized with V_Write. The user then interacts with the device by moving a stylus that emits an electromagnetic signal over the display medium. The electromagnetic signal may be entirely electric, entirely magnetic, or electromagnetic (i.e., light). The electromagnetic signal interacts with R_PEN, as described above, to cause PEN_TFT to open, thereby allowing the associated pixel electrode to become charged. Once the pixel electrode is charged, the electrophoretic medium will switch states, e.g., from white to black. Because the pixel is driven directly with V_Write, there will be almost no latency during the writing process, except for the negligible time that the electrophoretic particles take to traverse the thickness of the internal phase.

Figure 10:
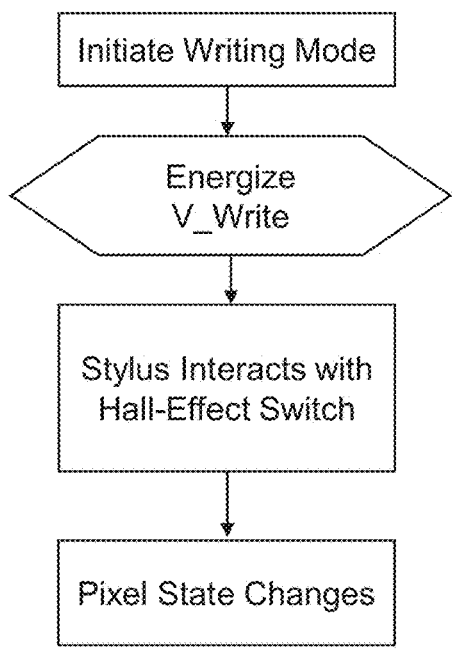
FIG. 10 illustrates an embodiment of a method for writing to writeable display medium including a Hall-Effect switch.

As described in FIG. 10, a method for of writing to a device including a writeable display medium having a sensing circuit of FIG. 8 is quite similar to the method of FIG. 9. A user begins by initiating the writing mode, which may be done with a physical switch or by touching an icon on the screen. Once in writing mode, the source of V_Write is energized or otherwise made available to the Hall-Effect Switch, so that a pixel electrode can be energized with V_Write. The user then interacts with the device by moving a stylus that provides a magnetic field over the display medium. The magnetic field interacts with the Hall-Effect Switch thereby allowing the associated pixel electrode to become charged. Once the pixel electrode is charged, the electrophoretic medium will switch states, e.g., from white to black. Because the pixel is driven directly with V_Write, there will be almost no latency during the writing process, except for the negligible time that the electrophoretic particles take to traverse the thickness of the internal phase.

Figure 11:
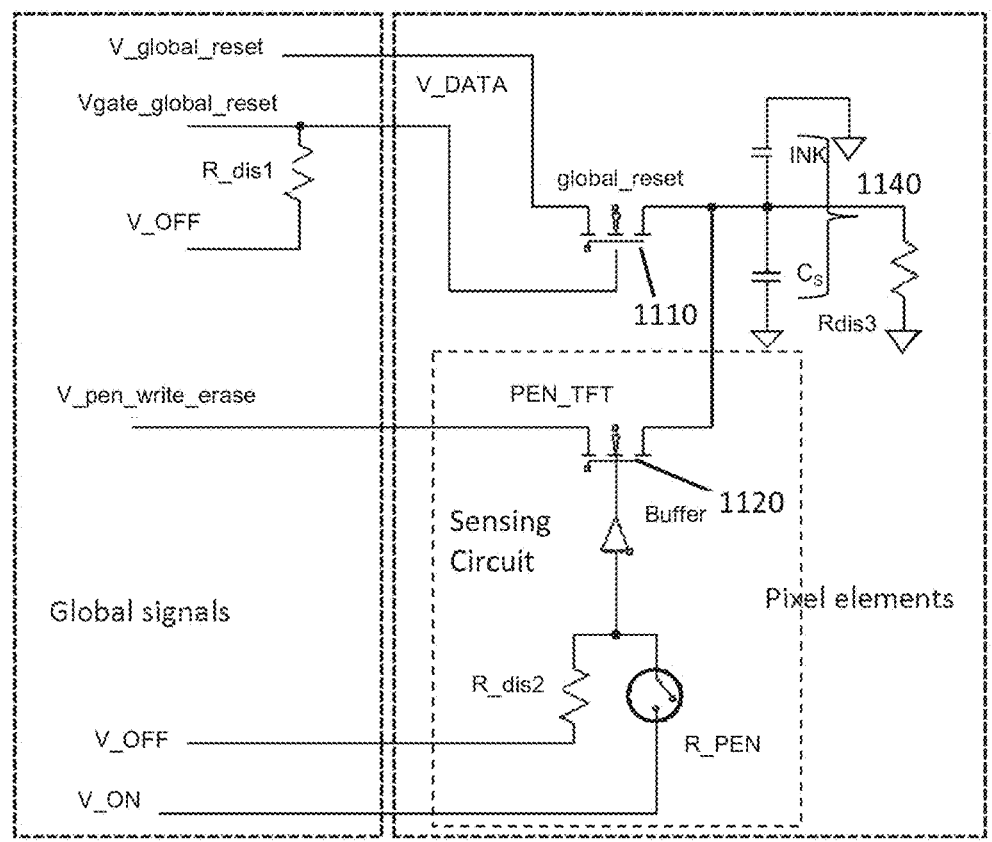
FIG. 11 illustrates an embodiment of a sensing circuit for use with a writeable display medium.

A further embodiment of a sensing circuit for a writeable display medium is shown in FIG. 11. However, unlike FIGS. 7 and 8, the sensing circuit of FIG. 11 is not used with a scan driver and data driver. Rather each pixel electrode in the active matrix array is coupled to both a global_reset TFT 1110 and a PEN_TFT 1120, wherein the global_reset TFT 1110 is coupled to a V_global_reset and a Vgate_global_reset, and the PEN_TFT 1120 is coupled to V_pen_write_erase and the gate is coupled through a Buffer to R_PEN and R_dis2, similar to FIG. 7. The resulting circuit allows a pixel to be "wiped" with the V_global_reset and then written with a stylus that interacts with R_PEN to open the gate of PEN_TFT allowing the pixel 1140 to be charged with V_pen_write_erase. The sensing circuit of FIG. 11 is used in a device that does not include decoding logic (scan and gate drivers) nor a display driver (controller). Accordingly, a writeable display device can be produce with much less expense. Additionally, if the TFTs are constructed from suitable organic materials, it is possible to produce a writeable device that is quite flexible, requires little power, is viewable in sunlight, and is completely re-writeable.

Figure 12:
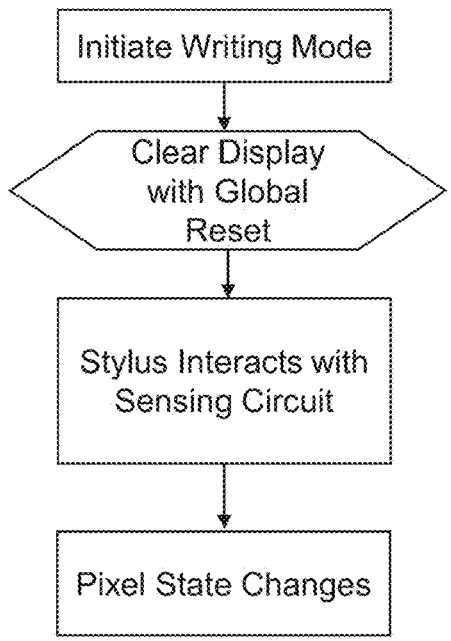
FIG. 12 illustrates an embodiment of a method for writing to writeable display medium including a sensing circuit.

A method for writing to a writeable medium including the circuit of FIG. 11 is described in FIG. 12. One the writing mode is enabled, i.e., by powering on the device, it is possible to clear the display with a global reset to prepare the medium for writing with a suitable stylus. The process begins when Vgate_global_reset is set to V_ON, which will open the global_reset transistor 1110. V V_global_reset is set to either V_white or V_black, thereby defining the desired starting state (uniform black or white). Next, the V_global_reset is set to V_OFF and the pixel state can only change if the sensing element (R_PEN) is activated, e.g., with a magnetic field from a stylus. A user may then write on the display medium by interacting with the sensing circuit. When the stylus passes over the R_PEN sense resistor, R_PEN goes into a low resistance state, PEN_TFT is turned on and V_WRITE is applied to the pixel electrode 1140. Once the pixel electrode has achieved sufficient voltage, the electrophoretic medium will switch states, providing feedback to the user. After the stylus has passed over the pixel, R_PEN goes back to a high resistance state and the sense element R_dis2 turns off PEN_TFT. While not shown in FIGS. 11 and 12, a device including the sensing circuit of FIG. 11 can be used in a white on black mode by simply reversing the polarity of V_global_reset and V_pen_write_erase, or the previously "written" pixels can be erased by reversing the polarity of V_pen_write_erase.

Figures 13, 14:
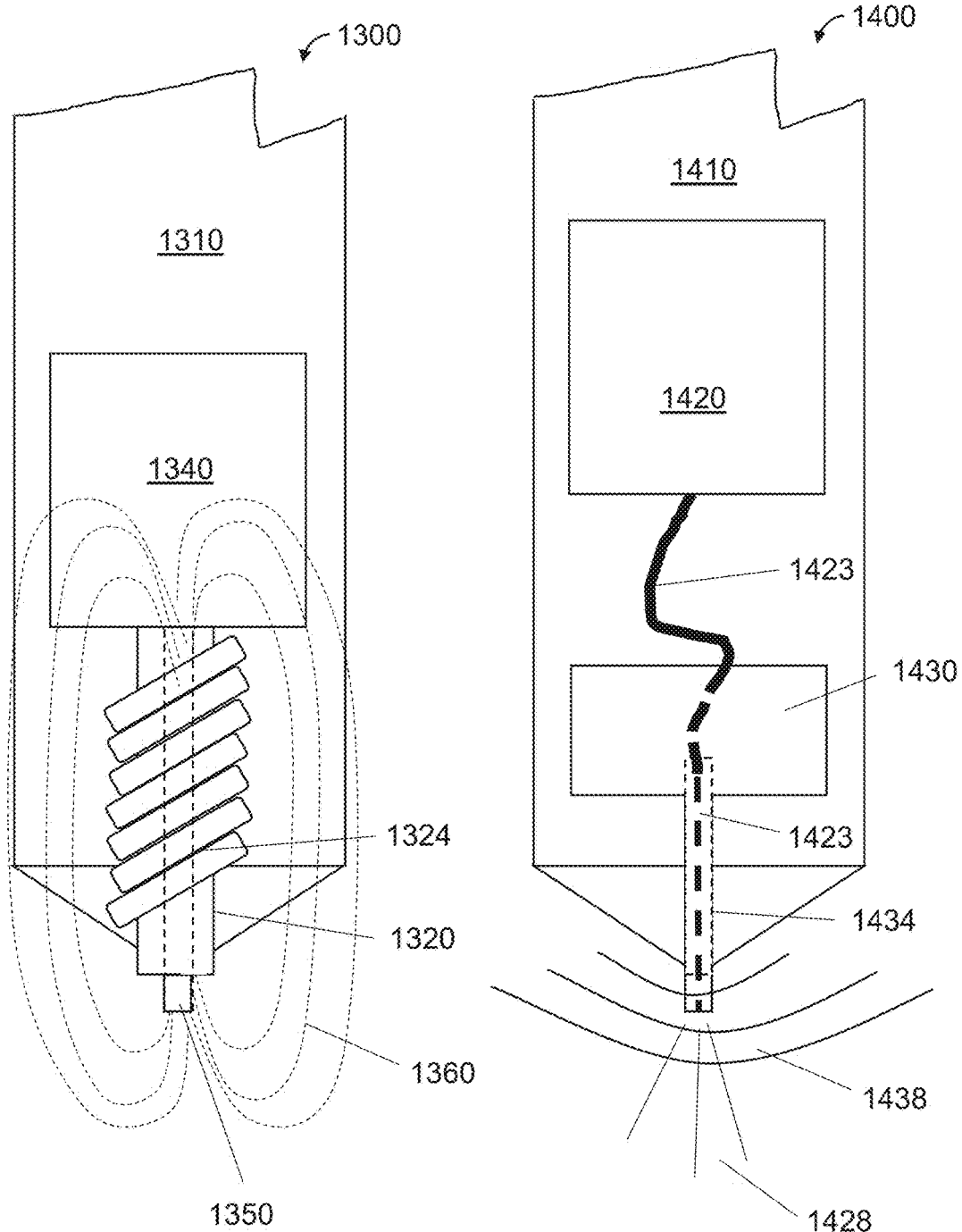
FIG. 13 illustrates a stylus including an electromagnet that may be used to actuate a writeable display medium including an inductive coil, a sensing circuit, or a Hall-Effect switch.
FIG. 14 illustrates a stylus including a light source that may be used to actuate a writeable display medium including a photosensor.

In many embodiments, the writeable display medium will be complemented by a conventional electromagnetic or capacitive digitizer that will track the position of the stylus. This configuration will allow the "writing" to be recorded at the same time the writeable display 420 is updated with the graphic 490. FIG. 13 shows a cut-away of the tip of a stylus 1300 having an electromagnet. The magnetic field 1360 produced by the electromagnet can interact with a sensing circuit as shown above, while at the same time interacting with a digitizing layer to allow the digitizer to track the position of the stylus 1300. The recorded position of the stylus can then be converted to a digital file or used to update the display, as discussed previously. The stylus 1300 comprises a body 1310 which is held by the user and which houses the electrical components needed for functionality. The electromagnet 1320 includes a ferromagnetic element and a coil 1324. The electromagnet 1320 is powered by a power supply 1340 that may include, for example, a battery. In the embodiments shown in FIG. 13, the stylus tip additionally includes a spindle 1350 that is spring-loaded and coupled to a switch in the power supply 1340 so that the electromagnet is energized only when the stylus 1300 tip is being pushed against a surface. A simple alternative to the electromagnet 1320 of FIG. 13 is to employ a rare earth magnet, such as a neodymium iron boron magnet or samarium cobalt magnet. In some embodiments that use rare earth magnets, the stylus 1300 does not include a power supply 1340.

An alternate stylus construction, for use with a photoresistor, e.g., in sensing circuit 720, is shown in FIG. 14. In FIG. 14, light 1428 is channeled through an optical fiber 1423 that travels within the inductive coil 1434, thereby allowing the light 1428 to exit the stylus 1400 at the tip. The light source 1420 may be an LED or a diode laser. Other laser sources may be used, however, the size and the shape of the stylus 1400 may vary with requirements for an optical cavity and lasing medium. The inductive coil 1434 is operatively coupled to electronics 1430 that permit the stylus to interact with a digitizing layer via electromagnetic signals 1438 so that the stylus movement can be recorded.

It is understood that other designs that allow the stylus to interact with a sensing circuit and at the same time have the movements digitized could be suitable. For example, a stylus having an electromagnet could additionally include a capacitive touch element in the tip, and the writeable device could use a capacitive touch screen to sense the position of the stylus during the "writing." A stylus to be used with the invention may include other additional elements, such as a power supply (e.g., a battery, e.g., a rechargeable battery), BLUETOOTH® communication, a button, or an eraser at the end of the stylus opposing the tip. For example, the eraser at the opposed end of the stylus could provide an opposite magnetic polarity to that of the writing tip.

In advanced designs, the writing modes are more complex. Algorithms for displaying and recording the writing can account for other factors beyond the position of the stylus. For example advanced algorithms may account for the user's hand position, the ambient lighting conditions, and the existence of previous images on the display. In some embodiments, it will be beneficial to reduce the number of sensing circuits that are activated to a number smaller than the entirety of the array of pixel electrodes. That is, during the writing only the sensing circuits in the vicinity of the stylus will be available to receive a signal and alter the state of the associated pixels.

Definitions

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" or "gray scale" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

From the foregoing, it will be seen that the present invention can provide a writeable electro-optic display medium including a sensing circuit and a stylus for causing a nearly instantaneous update of the display medium. In some embodiments the sensing circuit will allow one or more pixel electrodes to be pre-charged so that it will take less time to update an image based upon movements of a stylus that have been digitized by a digitizing layer. In other embodiments, the sensing circuit will allow individual pixel electrodes to be updated directly with a writing voltage. It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A writeable display medium comprising:
   a light-transmissive front electrode;
   an array of pixel electrodes;
   an electrophoretic medium comprising charged particles that move in the presence of an electric field, the electrophoretic medium being sandwiched between the light-transmissive front electrode and the array of pixel electrodes;
   a first set of transistors, each transistor having a drain, source, and gate, wherein the source is coupled to a data driver, the gate is coupled to a scan driver, and the drain is coupled to one of the pixel electrodes;
   a second set of transistors, each transistor having a drain, source, and gate, wherein the source is coupled to a write voltage source, the gate is coupled to a sensing circuit, and the drain is coupled to one of the pixel electrodes; and
   a digitizing layer configured to locate a touch on the writeable display medium.

2. The writeable display medium of claim 1, further comprising a power source operatively coupled to the data driver, scan driver, and write voltage source.

3. The writeable display medium of claim 2, further comprising memory operatively coupled to the digitizing layer and the data and scan drivers, the memory configured to receive position information from the digitizing layer and to send the position information to the data and scan drivers.

4. The writeable display medium of claim 1, wherein the sensing circuit comprises a magnetoresistor or a photoresistor.

5. The writeable display medium of claim 4, wherein the sensing circuit comprises a magnetoresistor, and the magnetoresistor comprises copper, iron, or cobalt.

6. The writeable display medium of claim 1, wherein the digitizing layer uses electromagnetic sensing to determine the position of a touch.

7. The writeable display medium of claim 1, wherein the digitizing layer uses capacitive sensing to determine the position of a touch.

8. A writeable system including the writeable display medium of claim 1 and a stylus comprising an electromagnet or a rare earth magnet.

9. A writeable display medium comprising:
a light-transmissive front electrode;
an array of pixel electrodes;
an electrophoretic medium comprising charged particles that move in the presence of an electric field, the electrophoretic medium being sandwiched between the light-transmissive front electrode and the array of pixel electrodes;
a plurality of transistors, each transistor having a drain, source, and gate, wherein the source is coupled to a data driver, the gate is coupled to a scan driver, and the drain is coupled to one of the pixel electrodes;
a plurality of rectifier circuits, wherein each rectifier circuit is operatively coupled to a pixel electrode;
a plurality of inductive coils, wherein each inductive coil is operatively coupled to a rectifier circuit; and
a digitizing layer configured to locate a touch on the writeable display medium.

10. The writeable display medium of claim 9, further comprising a power source operatively coupled to the data driver and scan driver.

11. The writeable display medium of claim 10, further comprising memory operatively coupled to the digitizing layer and the data and scan drivers, the memory configured to receive position information from the digitizing layer and to send the position information to the data and scan drivers.

12. The writeable display medium of claim 9, wherein the rectifier circuit comprises diodes.

13. The writeable display medium of claim 12, wherein the rectifier circuit is a full bridge diode circuit.

14. The writeable display medium of claim 9, wherein the digitizing layer uses electromagnetic sensing to determine the position of a touch.

15. The writeable display medium of claim 9, wherein the digitizing layer uses capacitive sensing to determine the position of a touch.

16. A writeable system including the writeable display medium of claim 9 and a stylus comprising an electromagnet or a rare earth magnet.

17. A writeable display medium comprising:
a light-transmissive front electrode;
an array of pixel electrodes;
an electrophoretic medium comprising charged particles that move in the presence of an electric field, the electrophoretic medium being sandwiched between the light-transmissive front electrode and the array of pixel electrodes;
a plurality of transistors, each transistor having a drain, source, and gate, wherein the source is coupled to a data driver, the gate is coupled to a scan driver, and the drain is coupled to one of the pixel electrodes;
a plurality of Hall-Effect switches operatively coupled between a write voltage source and one of the pixel electrodes; and
a digitizing layer configured to locate a touch on the writeable display medium.

18. The writeable display medium of claim 17, further comprising a power source operatively coupled to the data driver, scan driver, and write voltage source.

19. The writeable display medium of claim 18, further comprising memory operatively coupled to the digitizing layer and the data and scan drivers, the memory configured to receive position information from the digitizing layer and to send the position information to the data and scan drivers.

20. The writeable display medium of claim 17, wherein the Hall-Effect switch comprises gallium arsenide, indium antimonide, or indium arsenide.

\* \* \* \* \*